May 5, 1953  W. R. SPILLER ET AL  2,637,396
PAPER DRILL
Filed Dec. 26, 1946  8 Sheets-Sheet 1

Inventors
William R. Spiller and
Lloyd L. West
By
Marechal & Biebel
Attorneys Patented May 5, 1953

2,637,396

UNITED STATES PATENT OFFICE 2,637,396

PAPER DRILL

William R. Spiller and Lloyd L. West, Dayton, Ohio, assignors to Harris-Seybold Company, Cleveland, Ohio, a corporation of Delaware Application December 26, 1946, Serial No. 718,380

8 Claims. (Cl. 164—90)

This invention relates to power drills and more particularly to multiple spindle drills for drilling paper and the like.

It is the principal object of the invention to provide a multiple spindle drill which is simple and economical in construction, safe and reliable in operation, which is rapid in its action, and the operation of which is at all times under the ready control of the operator.

It is a further object to provide a multiple spindle drill in which any individual drill head can be separately removed, replaced or adjusted without affecting any of the other drill heads.

It is a further object to provide a paper drill in which the individual drills are received in a chuck which provides for securely holding the drill and taking the thrust thereof in use while allowing for ready removal and replacement thereof.

It is a further object to provide a paper drill operating under hydraulic power with a fast, smooth, uniform and readily controllable operation at all times.

It is also an object to provide a multiple spindle drill in which the bottom stop position of the group of drill heads is adjustable simultaneously.

It is likewise an object to provide such a drill in which an excessive load occurring at any point in the working stroke will cause the termination of such stroke and the return of the machine to its inoperative position before any damage is caused thereto.

It is also an object to provide such a multiple spindle drill in which the upper position of the group of drills is likewise adjustable simultaneously.

It is a further object to provide hydraulic mechanism for actuating a device such as a paper drill in which a work member is brought into working position with respect to a work table, in which the bottom position of the working member is determined by a positive stop in the path of travel of the hydraulic mechanism.

It is a further object to provide a hydraulically actuated drill in which the stroke is adjustable both at the top and at the bottom to adapt the drill to different work operations.

It is also an object to provide a drill of this character in which an emergency stop is provided by means of which a working stroke may be interrupted, reversed, or allowed to continue to completion, under the control of the operator.

It is a still further object to provide a hydraulic actuating mechanism for such a machine with the hydraulic mechanism being entirely confined within a housing or reservoir so that it forms a separately installed and easily removable power pack for the machine.

It is also an object to provide such a drill in which selected control over the speed of the downward or working stroke may be obtained by manual selection while maintaining a substantially uniform high rate of speed for the return stroke.

It is a further object to provide hydraulic operating mechanism for such a drill which is adequately protected against development of abnormal or potentially damaging pressures.

It is likewise an object to provide a simple and highly effective arrangement for collecting and disposing of the chips which are produced in the operation of the machine.

Other objects and advantages will be apparent from the following description, the accompanying drawings and the appended claims.

Figure 1:
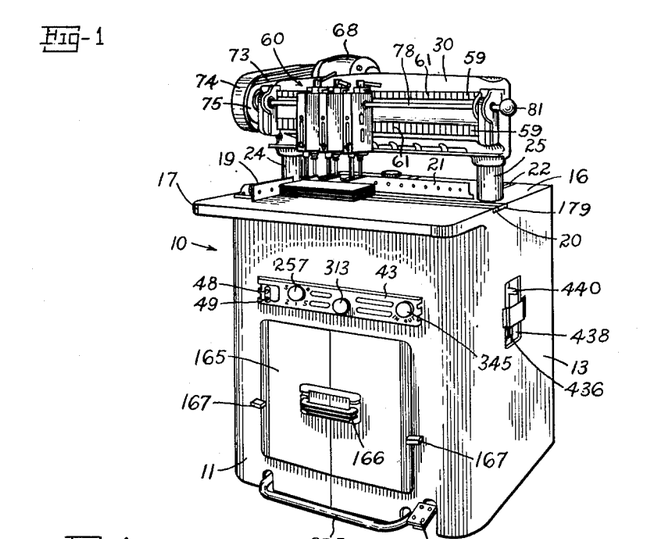
Fig. 1 is a view in perspective of a machine constructed in accordance with the present invention.
Figure 2:
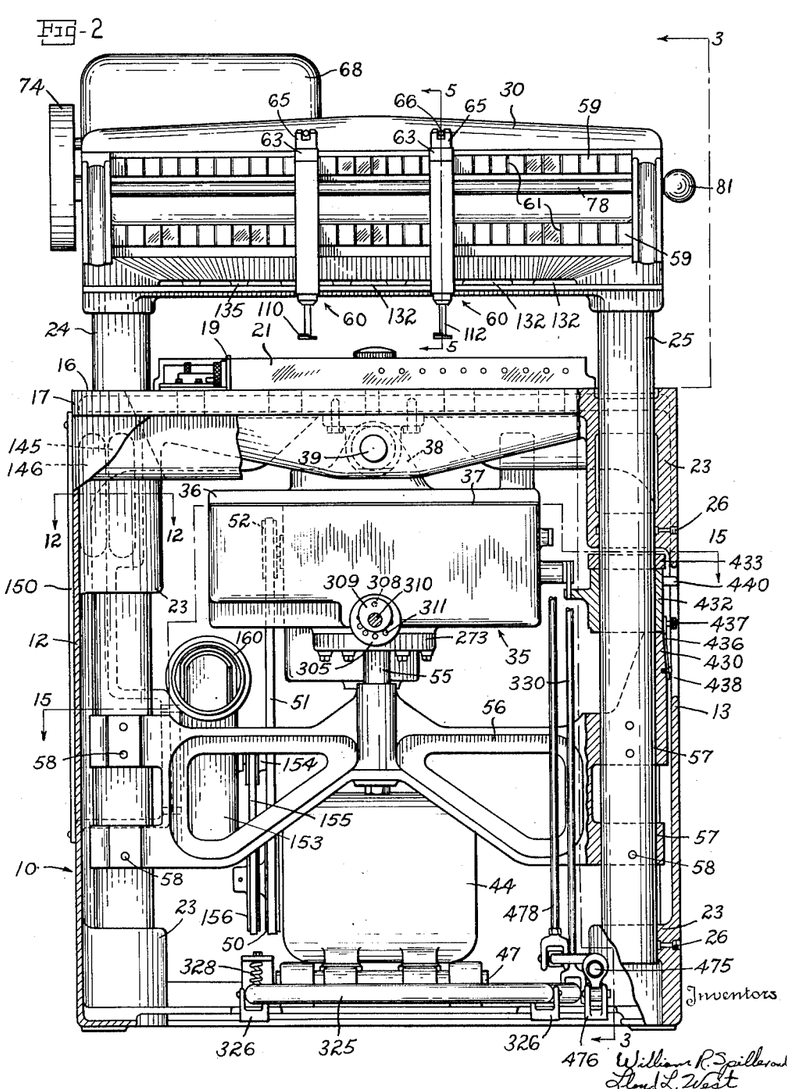
Fig. 2 is a view of the machine partially in front elevation, with the front housing and the right hand post guides being broken away, certain parts such as the chip collecting mechanism and the drawer being removed to better show the construction.
Figure 3:
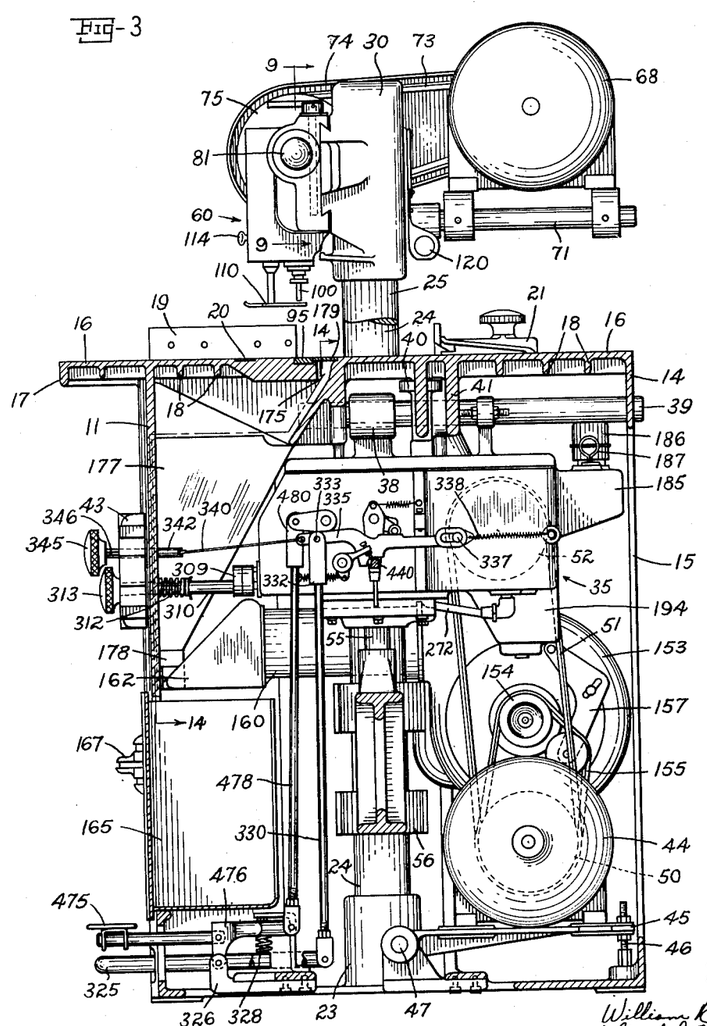
Fig. 3 is a vertical sectional view from one side substantially on the line 3—3 of Fig. 2.

Referring to the drawings which illustrate a preferred embodiment of the machine, and more particularly to Figs. 1 through 4, the machine is shown as comprising a main frame 10 in the form of a hollow shell, which is preferably formed as an integral casting incorporating a front wall 11, a left hand side wall 12, a right hand side wall 13, and a rear wall 14, the latter being open over the greater part of its extent as shown at 15 (Fig. 3). The top 16 is shown as formed integrally, and is arranged with a forward portion 17 overhanging the front wall 11, the top being suitably ribbed as shown at 18 to afford additional stiffness.

Figure 4:
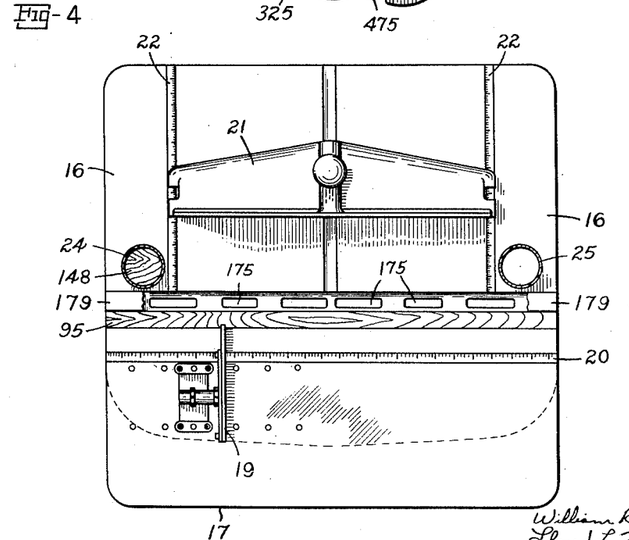
Fig. 4 is a horizontal sectional view showing the top of the work table in plan.

The top forms an essentially flat rectangular work table surface as shown in Fig. 4. The work table is formed with a series of apertures for adjustably receiving the gage 19 the position of which can be set with reference to a scale 20. A back gage 21 is adjustable at right angles to the front gage and its position may be determined by scales 22, such gage mechanism being known in the art.

Inwardly of the side walls pairs of lower and upper bosses 23 are provided, which are preferably formed integrally with the main frame 10. Both sets of bosses are bored to provide for receiving the guide posts 24, 25, and suitable lubricant injecting means 26 are preferably provided which are accessible from outside the frame to lubricate the posts in their reciprocating travel in the guides.

The posts 24, 25 support the rail assembly 30 on their upper ends, the rail extending transversely across the width of the work table and providing a support for the individual drill heads. The machine as illustrated thus embodies a work table with a rail movable relative thereto and supporting the individual drill heads, the structure illustrated providing a stationary table cooperating with the reciprocating drill heads; it will be evident however that the table may be caused to reciprocate with respect to relatively fixed drill heads while still maintaining the same essential features of operation and control.

Hydraulic power operating mechanism is provided for causing such relative reciprocating motion, this mechanism being in the form of a power pack indicated generally at 35, as comprising a closed integral casing for receiving the power operating mechanism and likewise forming a reservoir for the hydraulic fluid. The casing 35 has a removable cover 36 which is normally secured in fluid-tight relation thereto by means of gasket 37. In order to support the power pack in proper position within the hollow base of the machine the cover 36 is formed with an upstanding lug 38, and a bar 39 extends through lug 38, likewise extending through a bearing 40 mounted in the elongated flanges 41 of a plurality of the ribs which are integral with the under side of the work table 16. The bar is thus normally supported from beneath the work table, but when it is desired to install or remove the power pack, the bearing 40 is removed and the power pack can then be moved rearward on the bar and thus removed as a unit.

A drive motor 44 is pivotally mounted upon a platform 45 in the lower rear portion of the base, suitable adjusting means 46 being provided to rock the platform about its pivot 47 for the purpose of maintaining the proper tension in the drive pulley. The motor is conveniently controlled by start and stop buttons 48, 49 mounted on a panel 43 on the front face 11 of the frame. The shaft of the motor carries drive pulley 50 over which there operates V-belt 51 which has driving engagement with the pulley 52 which supplies the power to the power pack.

The fluid actuated piston within the power pack has a shaft 55 which extends downwardly from the lower side of the power pack as shown in Figs. 2 and 3 where it has connection with a cross head 56 having laterally extending arms which are bored as shown at 57 to receive the posts 24 and 25, respectively. The opposite arms of the cross head are secured to the posts by means of a series of pins 58 so that vertical movement of the cross head is transmitted directly to the two posts, and thereby to the rail assembly 30 of the machine.

*Rail assembly and drill heads*

Referring now to Figs. 5 through 12, the rail assembly 30 is formed as an integral casting with parallel gibs 59 extending transversely across its face and serving as a support to adjustably receive the individual drill heads indicated generally at 60. As shown in Fig. 2 the vertical face of the rail is preferably marked with a series of parallel indications 61 to facilitate the proper assembly and alignment of the drill heads thereon.

Each drill head 60 (Fig. 5) is formed with cooperating dovetail clamps 62, 63, the latter being adjustable upon stem 64, by means of nut 65 rotatably received on the threaded end of the stem and adjustable by means of handle 66. With this construction the nut can be loosened to allow each individual drill head to be mounted on the gibs 59, and the nut tightened to secure the drill head in place thereon, each such assembly and disassembly operation taking place independently of the positioning of any other drill head.

In order to drive the drills, a drive motor 68 (Fig. 3) also controlled by start and stop buttons 48, 49 on the front panel of the main frame, is mounted upon bar 71 secured in the rear face of the assembly 30, the motor having a drive belt such as V-belt 73 protected by a cover 74 and running over driven pulley 75 (Fig. 9) which is keyed to a female spline member 76 rotatably journaled upon anti-friction bearings 77 in the end of the rail assembly 30. A transverse shaft 78 having a male spline 79 is receivable within the spline member 76, and extends through the right hand wall of the rail assembly 30 where it is rotatably supported in anti-friction bearing 80, a suitable handle portion 81 being accessible on the outside of the rail assembly 30 for ready manipulation. The spring pressed detent 82 yieldably retains the shaft in its fully engaged and operative position while allowing axial withdrawal thereof from the right hand side of the rail.

Figure 5:
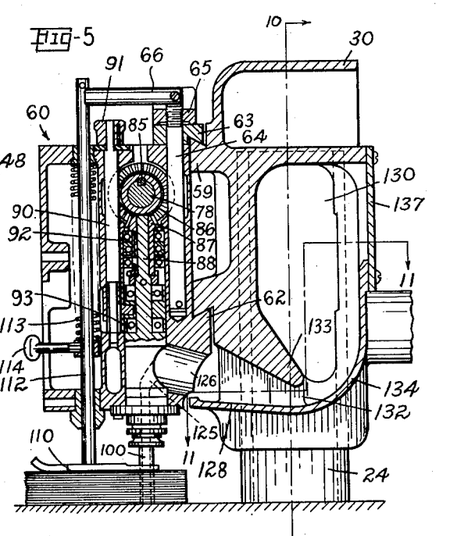
Fig. 5 is a vertical sectional view through one of the drill heads in operative position substantially on the line 5—5 of Fig. 2.

The shaft 78 has a key-way 84 therein which is adapted to receive the keys 85 secured to each drive pinion 86 (Fig. 5) in the individual drill heads. Gear 86 is a bevel gear as shown and engages with beveled pinion 87 for operation of the individual drill. The drill shaft is shown at 88 and is slidably but non-rotatably received within the shank of pinion 87 to provide for vertical adjustment in the position of the drill under the control of adjusting shaft 90 and control member 91. As shown in Fig. 5 the drill has been adjusted to its lowermost position relative to the drill head and may be raised above that position by suitable actuation of control knob 91 such adjustment providing, for example, a variation in vertical positioning of the drill of about ⅜ inch. Bearing set 92 for the pinion 87 and thrust bearings 93 for taking the thrust on shaft 88 are provided for effecting the vertical adjustment of the drill socket to bring the drill into accurate relation with the cutting stick 95 received with a slot in the top of the work table. Attention is directed to the patent to Wright, 1,835,551, of 1931, assigned to the same assignee as the present application for a further description of the construction and operation of this portion of the mechanism.

The drill is indicated at 100 as comprising a hollow tubular member, and is preferably provided with a shoulder 101 (Figs. 5 to 7) adapted to engage in a recess 102 formed in the end of a split chuck 103, the outer circumference of which is tapered to be received within the lower end of the drill shaft 88. The lower end of the drill shaft operates in spaced relation with respect to a retainer ring 104 secured to the lower face of the drill head 60 by means of bolts 105. An abutment ring 106 is secured to the drill shaft in such position that a suitable forked tool may be engaged against the abutment and the outer flange on the chuck to pry the latter out of the socket when it is desired to remove the drill from its socket.

Figure 6:
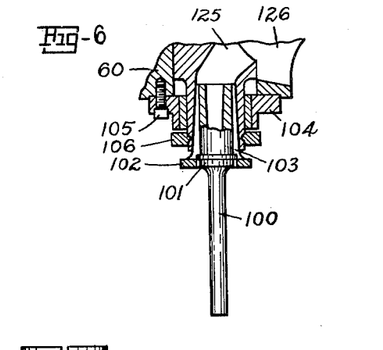
Fig. 6 is an enlarged detail view showing the means for detachably receiving the paper drill in the drill head.
Figures 7, 32:
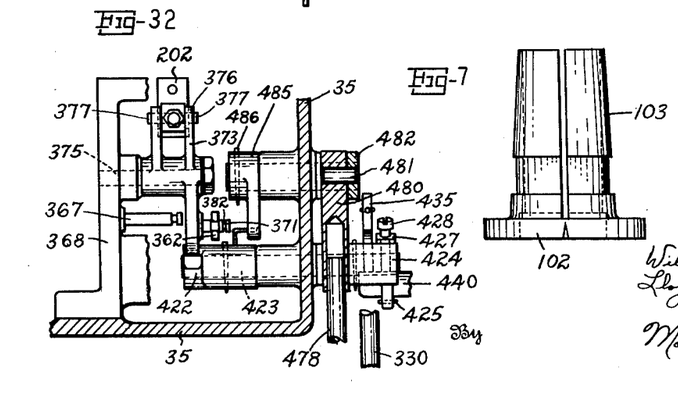
Fig. 7 is a further enlarged view showing the tapered chuck in elevation.
Fig. 32 is a somewhat modified vertical sectional view through the wall of the power pack substantially on the line 32—32 of Fig. 26.

This construction provides a simple and highly satisfactory mounting for the individual drills, providing for the ready removal and replacement thereof in their respective chucks, the thrust developed when the drill engages the work being effective through the tapered clamping chuck for gripping the drill more tightly and assuring its proper driving relation. At the same time the shoulder 101 provides a positive means of transferring the thrust, and avoids the difficulty encountered in the prior art constructions which frequently had a tendency to wear, allowing the drill to wedge in its socket from which it could be removed only with considerable difficulty.

Figures 8, 9:
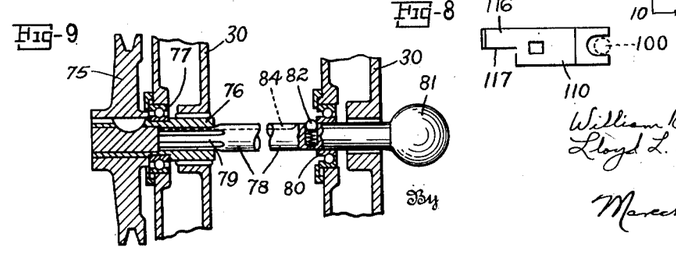
Fig. 8 is a detail view of the presser foot and centering index.
Fig. 9 is a vertical broken sectional view showing the drive for the individual drill heads which enables them to be separately adjusted and removed, the section being taken on the line 9—9 of Fig. 3.

A presser-foot 110 (Figs. 5 and 8) is carried upon a rod 112 which is vertically mounted in the head 60 and spring urged into work engaging position by means of spring 113, a handle 114 being provided by means of which it can be manually raised to free the work. As shown in Fig. 8 the presser-foot 110 has a forwardly projecting finger 116 thereon, the side edge 117 of which is accurately aligned with the center of the drill 100. Thus in setting up the drill initially, the index finger 116 and more particularly the edge 117 thereof can be adjusted with reference to scale 20 formed in the top of the work table, in that way providing for establishing an accurate spacing of the drill heads in predetermined relation to each other, to the gages, etc. A light source 120 (Fig. 3) is suitably mounted on the rear of the rail assembly in position to afford illumination for the work table.

*Collection and disposal of chips*

Hollow paper drills of the present type produce a substantial quantity of chips, in the form of paper confetti, the chips being passed upwardly through the hollow interior of the drill. The present machine provides for removing these chips from the drills wherever they may be located along the rail assembly, and for discharging them into a common receiver or container from which they may be readily removed from the machine. Referring to Fig. 5, each drill shaft has a curved passage 125 therein communicating directly with the upper end of the hollow drill itself and extending in a curved path toward one side where it discharges into a contoured passage 126 in the head. This passage provides for dropping the chips downwardly upon a plate 128 which is formed integrally with the rail assembly 30, the plate having a forwardly extending portion which closely underlies the baffle to assure the dropping of the chips thereon.

Figures 10, 11, 12:
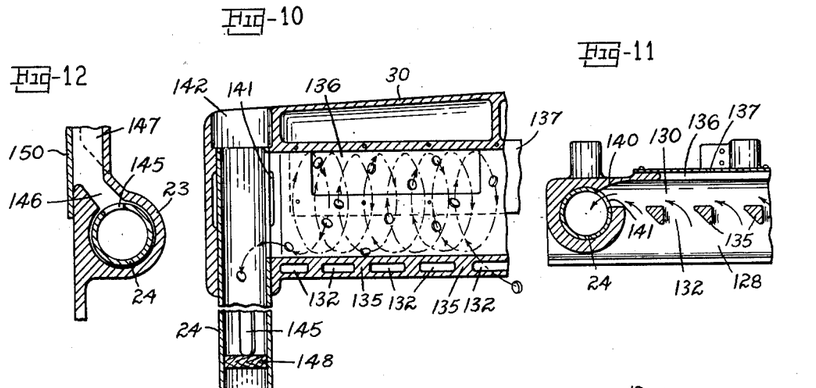
Fig. 10 is a vertical sectional view through the hollow chip receiving recess in the head showing the path of travel of the chips cut by the drill, the section being taken on the line 10—10 of Fig. 5.
Fig. 11 is a horizontal sectional view through the chip receiving recess on the broken sectional line 11—11 of Fig. 5.
Fig. 12 is a detail view in horizontal section through the left hand post showing the passage provided for receiving the chips, this section being taken on the line 12—12 of Fig. 2.

It is important to provide for collection of the chips from the individual drill heads in whatever positions they may occupy across the face of the rail 30, and to accomplish this result without requiring individual connections to be made to these separate drill heads. For this purpose the collecting system shown in Figs. 5 through 14 is provided, comprising a relatively large vacuum chamber 130 which is conveniently formed by coring the rail 30. A series of restricted entrances 132 thereto are provided across the width of the rail, and are defined at the top thereof by a downwardly extending forward wall 133 integral with the rail 30 and an upwardly curved rear wall 134 within the chamber. A series of webs 135 are provided, integrally connecting the depending wall 133 with the bottom plate 128, and these spacers or guides (Fig. 11) are preferably substantially triangularly shaped as shown to allow free passage of air currents therebetween while imparting a motion thereto in the direction toward one side of the machine, indicated at the left hand side in the drawing. In order to maintain an effective velocity of flow throughout the entire length of the passage, the individual guides are spaced progressively farther apart in the direction away from the suction end of the chamber as indicated in Fig. 10. Suitable openings 136 may be provided at spaced points along the rear wall of chamber 130, and are normally closed by access plates 137 secured thereto, which are removable when necessary to afford access to the passage.

Figure 13:
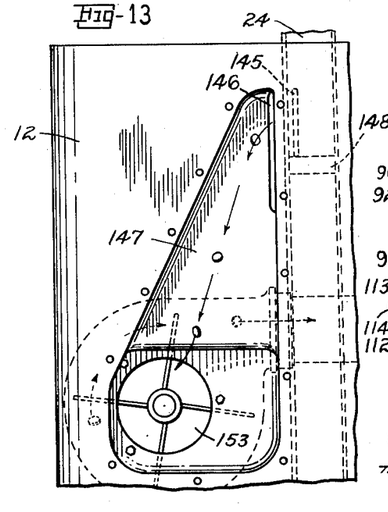
Fig. 13 is a partial side elevational view of the machine with the side cover removed showing the path of travel of the chips into the inlet of the blower.

At the left hand end of the rail, the passage 130 is curved as shown at 140 (Figs. 10 and 11) and communicates through a slotted opening 141 with the upper end of the hollow post 24. The post is closed at its upper end by cap 142, and at an intermediate point in its length, namely, that portion which is received within the left hand upper boss 23 of the base, it is formed with a vertical slot 145 which communicates with a corresponding passage 146 formed within boss 23 and leading into a downwardly extending passage 147 (Fig. 15) integrally formed in the side wall 12 of the main frame. As shown in Fig. 13, the vertical extent of the passage 146 in the frame is sufficiently greater than that of slot 145 in the post 24 to maintain registry thereof throughout the vertical travel of the post so that communication is thus established at all times. The hollow interior of the post is closed by a suitable block 148 immediately below the slot 145 to prevent the dropping of the chips farther through the post.

Figures 15, 24, 25, 30:
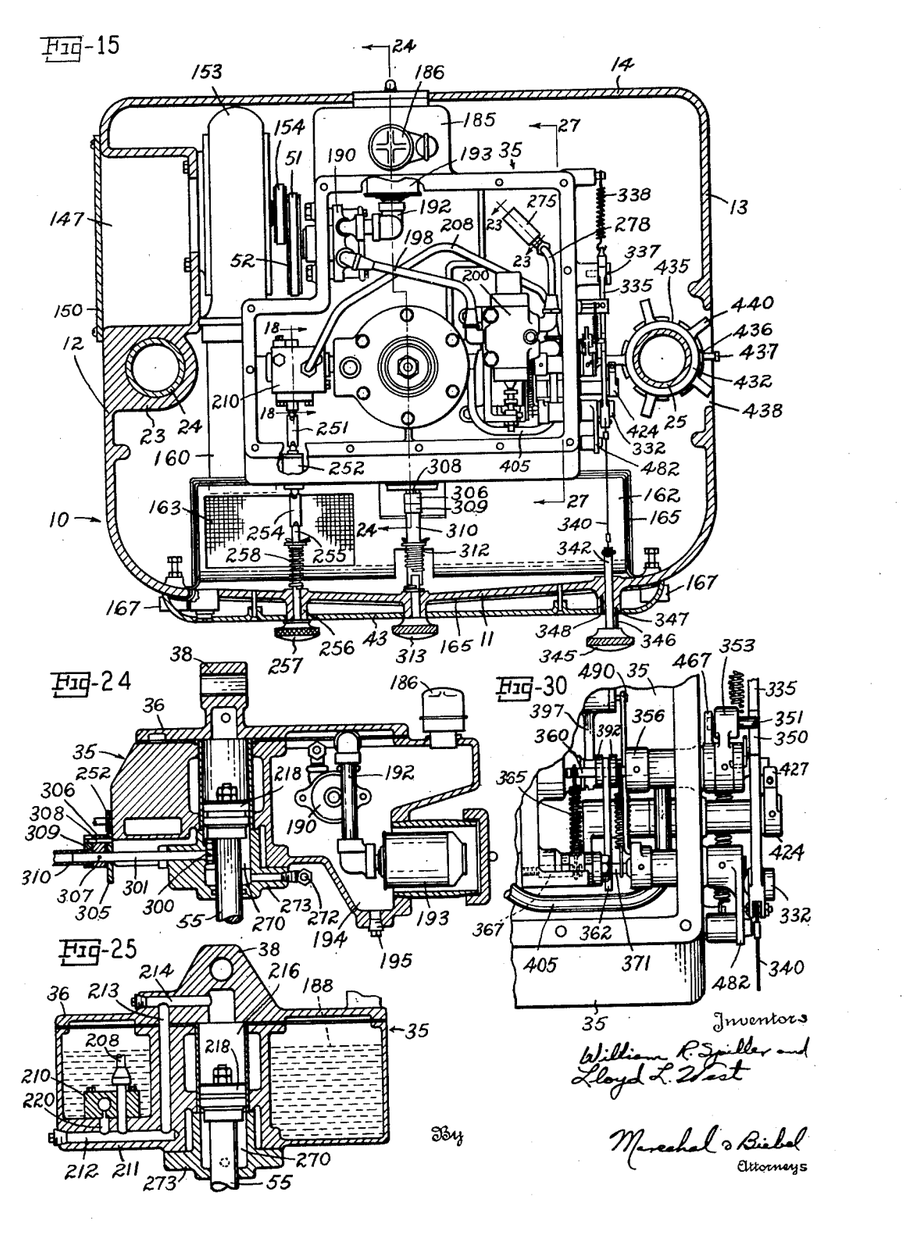
Fig. 15 is a horizontal sectional view looking down upon the power mechanism with the top cover thereof removed, the section being taken substantially on the line 15—15 of Fig. 2.
Fig. 24 is a vertical sectional view through the power actuating mechanism on the axis of the piston, along the line 24—24 of Fig. 15.
Fig. 25 is a view in vertical section somewhat diagrammatic in character indicating the path of flow of the actuating fluid for the down operation of the piston.
Fig. 30 is an enlarged view of the lower right hand corner of the mechanism shown in the power pack in Fig. 15.

As shown in Fig. 15, the passage 147 is closed by a cover plate 150 mounted on the side wall 12 of the machine, thus forming a closed chamber for the travel of the chips therethrough. At the lower end of this chamber 147, the chips travel into the open end of a blower 153 suitably mounted upon the wall of the frame and having a drive pulley 154 driven by V-belt 155 from a second drive pulley 156 (Fig. 2) on the shaft of motor 44. A suitable belt tightener and idler pulley assembly 157 may be provided as shown in Fig. 3.

The discharge of the blower leads through forwardly extending tube 160 to a screen box 162 (Figs. 3 and 14) located centrally and immediately behind the front wall 11 of the main frame. A screen 163, mounted on an angle as shown in Fig. 3 is provided opposite the end of tube 160, in order to allow escape of the air discharged by the blower, the screen however preventing passage of the chips therethrough. The lower end of the box 162 is open and is positioned immediately above a chip drawer 165 having a handle 166 which is suitably received in a recess in the front of the machine, being removably secured therein by latch means 167.

In operation of the machine, the blower which is in direct communication with the chamber 130 in the rail, establishes a reduced pressure therein, causing a continuous inflow of air across the face of plate 128 and through the series of passages 132. These passages are of relatively small cross sectional area and thus the velocity of the air flow therethrough is relatively high. As the chips fall on the surface of the plate, they are drawn inwardly toward the throats of the several passages 132, and in doing so acquire a relatively high velocity. The wall portion 134 of the chamber immediately to the rear of these passages is curved upwardly and the chips thus travel in this curved path and move upwardly into the relatively much slower moving body of air in the large chamber 130. With a lesser velocity of flow, the chips are allowed to drop downwardly, but in the course of their travel, because of the continuous flow of the air toward one end of the chamber, the chips are caused to advance lengthwise toward the discharge end of the passage. Upon falling downwardly over the wall 133, the chips again drop into the zone of high velocity air flow and are again picked up and moved further toward the discharge end, thus developing a spiral path of travel as indicated by the arrows in Fig. 10. As a result, therefore, the chips are repeatedly accelerated and allowed to drop and so progress through the hollow chamber 130 with a substantially spiral motion, which keeps them agitated and avoids collection of any mass of the chips, causing them all to be delivered for discharge into the upper end of the left hand post 24. It will be evident that the chip disposal means is so arranged and located laterally of the working space on the table that such space is substantially unobstructed.

From this point the path of the chips will be evident, passing downwardly through the hollow post, out through slot 145 and into the passage 146 and the chamber 147 in the side wall of the machine from which they feed directly to the inlet of the blower. From the blower 153 the chips are discharged against screen 163, the air passing through the screen, and the chips dropping through the open bottom of box 162 into receptacle 165 from which they can be periodically removed.

Figure 14:
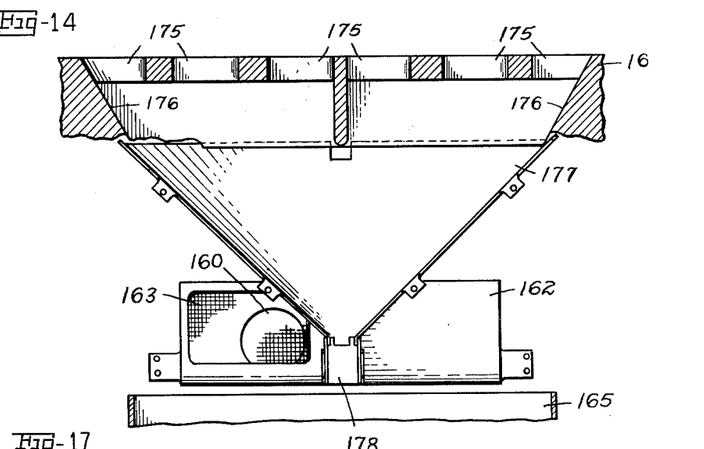
Fig. 14 is a broken sectional view substantially on the line 14—14 of Fig. 3 showing the path of discharge provided for chips produced on the cutting table.

In the operation of the machine for producing marginal slits or slots in the paper, chips are also formed, appearing in this case on the top of the work table 16 and substantially immediately in the vicinity, or to the rear, of the drill heads on which the slitting or slotting attachment knives are secured. In order to provide for the collection of these chips, the work table is provided with a series of openings 175 which extend in a line across the width of the machine as shown in Figs. 4 and 14. The side walls of these openings are tapered as shown at 176 and provide for the collection and delivery of the chips through a funnel 177 having a discharge opening 178, directly leading into the receptacle 165. Thus the chips from both sources are readily collected, and in the case of the slots 175, the chips fall directly by gravity into the receiving container. In some cases where no such slotting operations are to be performed, it is preferred to close the opening 175 by means of a plate 179 which overlies the series of openings and thus forms a smooth uniform work table surface.

Power pack and hydraulic system

Referring now to the operation of the power pack and the control mechanism for controlling the reciprocating movement of the head, the power pack 35 is provided with an extension 185 (Figs. 3 and 27) at the rear thereof in which there is located a filling cap 186 and a liquid measuring stick 187 to provide for maintaining a constant liquid level within the reservoir substantially as indicated at 188.

Referring to Figs. 15 and 24, the liquid pump is shown at 190, being located within the reservoir and below the normal liquid level therein. It has an inlet line 192 which picks up the fluid in the reservoir through a strainer 193 located below the normal liquid level but spaced somewhat above the bottom of the reservoir to allow for the collection of impurities in the well 194 from which they may be removed by a removal of drain plug 195. Pump 190 is constantly driven when the machine is in operation from the motor 44, belt 51 and drive pulley 52, as previously described.

The pump delivers fluid under pressure through the delivery line 198 to the directional valve generally indicated at 200. This valve may be of suitable construction such as a "Vinco" four way open center, open port valve and has a central pressure chamber supplied with fluid under pressure which is selectively allowed to flow to one or the other of two pressure flow lines while exhaust of the fluid is simultaneously provided for from the other such line. The valve stem 201 as shown in Fig. 27 carries a projecting finger 202 which is movable between "down" position adjacent stop 203, through a central neutral position in which it is shown in full lines, to a right hand position adjacent stop 204 providing for the "up" direction, the stops being adjustable to secure proper operation of the valve.

Figure 16:
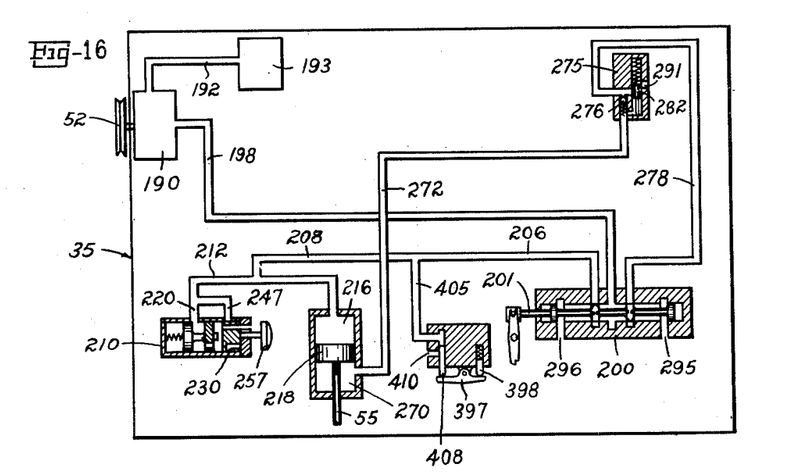
Fig. 16 is a diagrammatic view showing the hydraulic circuit and its controls.
Figure 27:
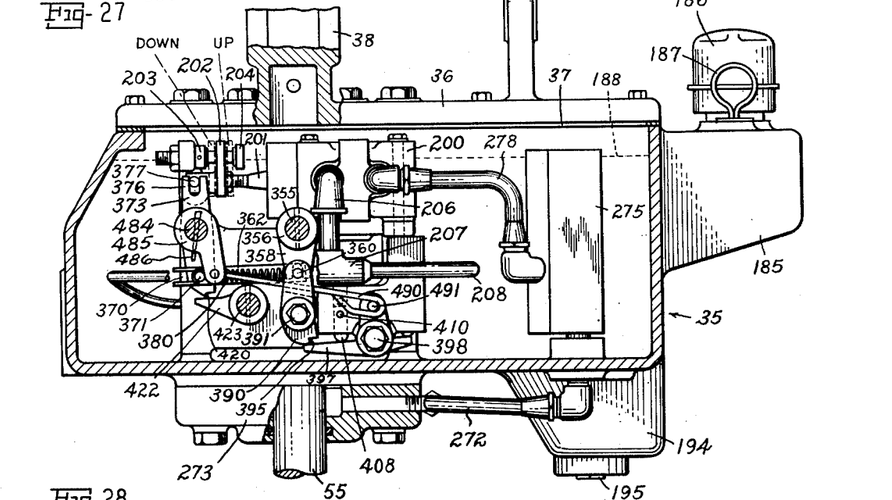
Fig. 27 is a vertical sectional view on a plane parallel to that of Fig. 26 but within the housing of the power pack and on line 27—27 of Fig. 15.
Figures 28, 29:
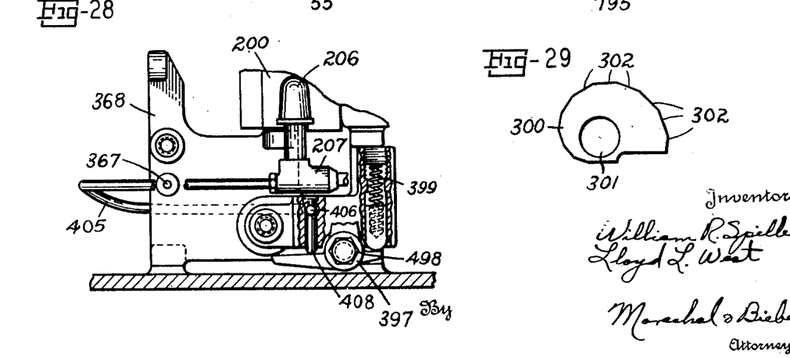
Fig. 28 is a view in side elevation of the pressure actuated release mechanism for effecting stoppage of the downward travel of the head and reversal thereof.
Fig. 29 is a detail view of the adjustable stop for determining the bottom limit of travel of the movable rail assembly.

The flow line from the directional valve providing for supply of the fluid for the down direction is shown at 206 in Figs. 16, 27 and 28, and is provided with a T-connection 207, from which the line 208 leads to the speed control valve 210 (Figs. 15, and 17 through 22). The purpose of the speed control valve is to provide a variable and controllable rate of descent of the rail assembly on its downward or working stroke, as desired for handling different types of work, while maintaining a substantially uniform high rate of return speed of travel. In this way the maximum proper downward travel of the drill heads is provided for on the working stroke, but even where that is necessarily slowed down for best operating results, the return travel remains rapid, and thus a stroke of operation is accomplished with a maximum of speed and assurance of proper operating conditions.

Figures 17, 18, 19, 20, 21, 22, 23:
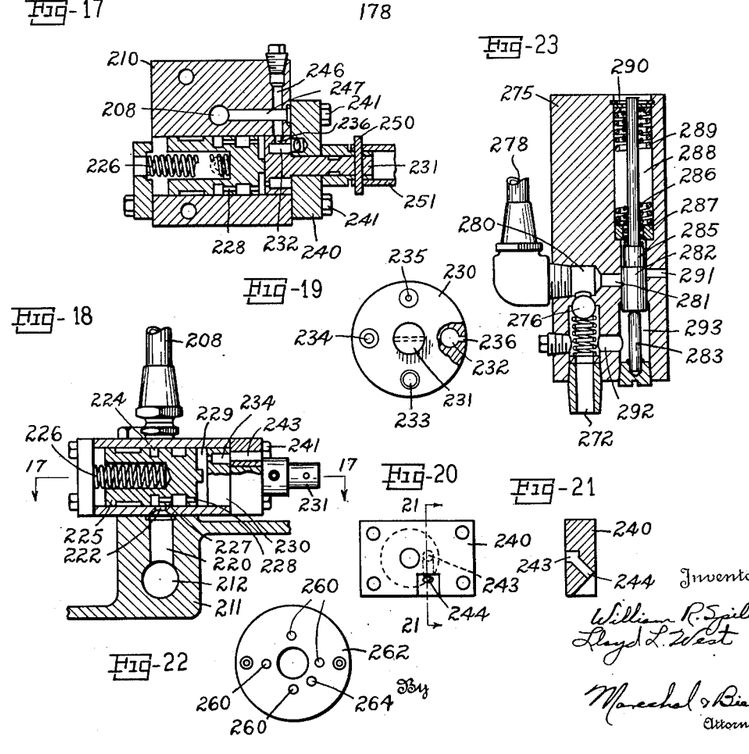
Fig. 17 is a view in horizontal section through the speed control valve substantially on the line 17—17 of Fig. 18.
Fig. 18 is a vertical section through the speed control valve substantially on the line 18—18 of Fig. 15.
Fig. 19 is a view in end elevation on an enlarged scale of the adjustable orifice plate incorporated in the speed control valve.
Fig. 20 is an elevational view of the front plate of the speed control valve.
Fig. 21 is a section through this plate on the line 21—21 of Fig. 20.
Fig. 22 is an elevational view of the index plate for determining the positioning of the speed control member.
Fig. 23 is a view in vertical section on the line 23—23 of Fig. 15 showing the construction of the hydraulic counterbalancing valve.

Referring to Figs. 17 through 22 which disclose the construction and operation of the speed control mechanism, the pressure supply line 208 delivers pressure fluid into the body of speed control valve 210 and communicates directly with a passage 212 which is formed in the lower wall of the power pack, as shown in Figs. 18 and 25. Passage 212 communicates with an upwardly extending passage 213 which in turn communicates with a laterally extending passage 214 to provide for delivery of the fluid into the upper end of cylinder 216 in which the piston 218 operates, the piston being directly connected to the main piston rod 55.

The speed control valve provides for bleeding a predetermined quantity of fluid from the pressure supply line 208 in order to maintain a regulated rate of flow to the piston at different flow rates, and thus to establish a controlled rate of travel of the piston and correspondingly of the rail assembly. It is also desirable to provide for a uniform rate of travel notwithstanding changes in the load, and consequently a uniform rate of supply of the fluid to the cylinder space 216 so that the same rate of travel of the piston is maintained both before and after the work is engaged.

For this purpose a passage 220 (Fig. 18) formed in the wall of the power pack 211 and in direct communication with passage 212 leads through a throttling orifice 222 into a valve chamber 224 in which the axially movable valve body 225 is located. Spring 226 normally urges the valve body toward the right, while the pressure of the fluid introduced through port 222 engages the face of the valve body and tends to move the same toward the left. When this action takes place, however, a land 227 formed integrally with the body partially closes the port 222 thus restricting the flow and providing for maintaining a regulated pressure within the valve chamber. The valve body is ported as shown at 228 to provide for the free flow of the fluid into the end chamber 229, this chamber being closed by a selector disk 230 (Fig. 19).

Selector member 230 is formed with a forwardly projecting stem 231 by means of which it may be rotatably adjusted, and is likewise provided with a series of drilled openings 232, 233, 234 and 235. As indicated in Fig. 19, opening 232 is closed at its inner end but has a side passage 236 leading radially outwardly therefrom (Fig. 17). Each of the remaining ports 233 to 235 inclusive, has no side passage but is formed with a central aperture through its inner or bottom end, these apertures being of progressively varying size with opening 235 being of the smallest size.

The selector disk 230 cooperates with a fixed plate 240 which is secured in position on the face of the valve body 210 by means of bolts 241, and this plate is provided with a port 243 (Fig. 21) which leads outwardly through passage 244 providing for discharge of the fluid directly into the reservoir. In Fig. 18 the selector valve has been shown in the position in which one of its ports 234 is in alignment with passage 243 thus providing for discharge of the fluid from chamber 229 directly back into the reservoir. In Fig. 17 the port 232 has been shown in alignment with passage 243 of the plate 240, and further in this position it will be evident that the passage 236 is aligned with an auxiliary passage 246 formed in the valve body 210, which in turn communicates with passage 247 in direct communication with the supply line 208.

In operation, and assuming first that the selector disk 230 is in one of the speed control positions with for example its port 234 in alignment with passage 243, the operation is as follows. Fluid under pressure is supplied through conduit 208 into passage 212, passages 213 and 214, and from there into the upper side of the cylinder for a downward stroke of movement. However, there is a parallel path of flow for the fluid supplied from the pump, and hence the rate of downward travel of the piston is less than it would be if the full flow were being delivered to the piston. This parallel path of flow comprises the passage 220, port 222, the valve chamber 229, and through the port 234, and passages 243, 244, to the reservoir. This parallel passage bleeds away a part of the fluid flow and thus provides for control of the downward descent of the piston. The function of the regulating valve 225 is to maintain a uniform pressure in the valve chamber 229 and thus to establish a uniform quantity of fluid passing through the bleed-off passage which it does by maintaining a substantially uniform pressure regardless of which of the ports 233—235 is aligned with the discharge outlet. With the pump continuing to deliver a uniform volume of fluid, and with a constant quantity being bled off, it is clear that the fluid will be supplied to the piston at a constant rate, notwithstanding variations in the load imposed on the piston as the result of the drills encountering the work.

In order to vary the rate of downward travel of the piston, the selector stem 231 is rotated to bring a selected one of the ports 233 to 235 into alignment with the aperture 243, as will be readily understood.

It is likewise desirable to be able to stop the rail assembly at the bottom of its travel in order to provide for the accurate setting of the individual drill heads with reference to the cutting stick on the work table. This is accomplished with the present control by adjusting the selector disk 230 to the position where its port 232 is in alignment with passage 243, under which conditions the passage 236 is also in alignment with the passages 246, 247. It will be evident that in this position a direct discharge path is provided for the fluid from the pressure line 208, through passages 247, 246, ports 236, 232, 243 and 244, leading directly to the reservoir. The pressure control valve 225 is not included in this flow path and it will thus be clear that the full fluid flow is discharged back to the reservoir; even though the directional valve is set to supply fluid to the piston in the down direction, there will be only a relatively reduced fluid pressure effective upon the piston, and thus it will merely proceed to its bottom position and remain in such position. This is referred to as the "stop bottom" position and makes it possible for drills to be accurately adjusted relative to the cutting stick.

In order to provide for adjustment of the selector disk 230 from the face of the machine, its stem 231 is connected by means of pin 250 with an operating tube 251 which in turn connects with a shaft 252 passing through and sealed with respect to the wall of the power pack (Fig. 15).

At its outer end shaft 252 is similarly coupled with a tube 254 and that in turn is actuated by a shaft 255 which extends through boss 256 formed on the front wall of the main frame. A hand knob 257 is secured to the outer end of shaft 255 and is yieldingly urged inwardly by spring 258, the handle carrying a suitable detent on its inner face which is adapted to be seated in one of the several recesses 260 on an index plate 262 as shown in Fig. 22. The plate is suitably secured to the front wall of the main frame and is provided with four recesses similarly numbered 260, and located in 90° relation with respect to each other, corresponding to the ports 232 to 235 of the selector disk 230. Thus by turning the knob 257, its detent can be seated in any desired one of the recesses 260, to thus select one of the settings of the selector disk 230, corresponding to three different speeds, and the stop bottom position.

In addition as shown in Fig. 22 there is an intermediate recess 264 at an intermediate position between an adjacent pair of recesses 260. When the control knob is adjusted to the position determined by this recess 264, the selector disk 230 is thereby set in such position that none of its ports aligns with the discharge passage 243 or with passage 246. Hence the bleed path is entirely closed, and thus the full flow of the fluid is transmitted to the upper side of the piston, and this provides for downward travel of the rail assembly at maximum velocity.

As the piston 218 travels downwardly, the fluid on the lower side thereof is discharged from the lower cylinder space 270 (Fig. 24) and flows through conduit 272 which leads through a packing box 273 bolted in position beneath the power pack, the conduit 272 leading into a hydraulic compensating valve 275, shown in section in Fig. 23. This valve has a ball check 276 which seats against a return flow of fluid from the bottom cylinder 270 toward the valve, as will be evident from the showing of the construction in Fig. 23. A pressure line 278 leads into the valve 275 from the directional valve 200 (Fig. 27), and it is through this line that pressure is delivered from the directional valve when the latter has been adjusted for upward travel of the piston. The valve 275 is suitably drilled to provide a chamber 280 with a communicating passage 281 which is normally closed by a slide valve 282 limited by a fixed pin 283 and suitably guided for axial travel. The valve 282 has a shoulder portion 285 of reduced diameter, and against the upper end of this shoulder there acts a compression spring 286, the spring passing through an aperture in a washer 287 which is seated within a cylindrical passage 288 provided in the body of the valve. The washer 287 is normally retained in its lower position by means of an outer and more powerful spring 289, both springs being retained in place by cap 290. A discharge passage 291 leads directly into the reservoir, and a cross passage 292 leads from the conduit 272 to a pressure chamber 293 located below the valve 282.

The operation of the hydraulic compensating valve is as follows. It is important to provide for a properly controlled and regulated descent of the rail assembly at all times, including the period when it is merely falling freely and before the drills have engaged the work, as well as during the drilling of the work. If there were no provision otherwise, and the rail assembly were actuated to begin a downward stroke, it could fall more rapidly than the rate of delivery of the fluid above its operating piston, and this would be undesirable as providing an excessive rate of travel, and also as involving a shock and subsequent slowing down of its travel when the drill actually encountered the work. It is the purpose of the hydraulic compensating valve therefore to maintain the downward travel of the assembly uniform throughout the operation and particularly during the period before the work has been engaged.

To accomplish this, the fluid from beneath the operating piston 218 flows through the conduit 272 and into the valve 275, its direct passage into chamber 280 being blocked however by the ball check 276. It is thereupon forced to travel through passage 292 and into chamber 293 where it raises the valve 282 against the force of its lighter compression spring 286. As the valve 282 rises, it will uncover the port 281 and allow the fluid to flow into chamber 280, through the pressure line 279, and into the directional valve 200 from which it is discharged back into the reservoir through discharge port 295. The pressure of spring 286 acting on valve body 282 thus establishes a relatively light but sufficient hydraulic brake upon the downward travel of the piston to prevent its falling away from the fluid and to require an actual fluid application to drive the piston downwardly and thus the piston will be driven downwardly on its working stroke at a predetermined and uniform rate, as already described.

When the directional valve 200 is moved to the up position with the member 202 against stop 204, fluid under pressure is delivered from the directional valve through conduit 278 and into compensating valve 275. However with the fluid now flowing in the opposite direction, ball check valve 276 is unseated, and the fluid passes directly through conduit 272 and into the cylinder 270 beneath piston 218, causing the piston to travel upwardly in the return stroke of movement.

It is not necessary to provide a variable rate of speed of the piston on its return stroke, and thus the full pump discharge is supplied in the path of flow just described so that the piston uniformly travels at its maximum rate during its return stroke. The fluid above piston 218 is displaced and flows through passages 214, 213, 212, and conduit 208 back to the directional valve 200 from which it is discharged into the reservoir through discharge port 296.

Should however any obstruction be encountered in the return travel of the rail assembly such as might lead to excessive or damaging loads or abnormally high pressure conditions, a pressure relief is provided which will safeguard the mechanism. Under such conditions assuming that the upward travel of the rail assembly is blocked, the pressure is built up and is transmitted through passage 292 into chamber 293, thereby raising the slide valve 282, the smaller diameter portion 285 passing freely upwardly through washer 287. When the lower edge of valve 282 passes port 281, no change takes place because that space is already in communication with chamber 293. As the pressure rises still further, the shoulder formed by the larger diameter portion 282 engages washer 287, and raises it against the action of the inner spring 286 as well as the heavier outer spring 289, sufficiently to open the escape port 291. The springs are so selected as to maintain a high but not excessive pressure and to release before a dangerous condition could develop.

In addition to providing for individual vertical adjustment of the drill heads, it is desirable to provide for a range of adjustment in the bottom stop position of the rail assembly. This is desirable to provide an extended range of travel of the rail assembly and of the drill heads mounted thereon. The drills are shortened with sharpening in use, and furthermore drills of different diameters are customarily of substantially different initial length, and it is thus desirable to provide for a range of bottom positions of the rail assembly with reference to the work table.

In order to accomplish this adjustment of the bottom stop position, a positive stop member is interposed in the path of the piston 218, this stop having a series of variable positions. The stop is shown in elevation at 300 in Fig. 29 and in operative position beneath the piston in Fig. 24. It is mounted for angular adjustment on shaft 301 and is formed with a series of flats 302 on its outer circumference each of which is at a progressively different distance from the center of the shaft 301 providing in effect a spiral shape as shown.

The stop is rotated by means of the shaft 301 which extends through the seal cap 273 secured on the bottom side of the power pack, and through a plate 305 secured in position on the front of the power pack. A disk 306 is secured to shaft 301 by means of pin 307 and has an aperture therein through which there extends a pin 308 carried by an arm 309 which in turn is secured to an actuating tube 310 (Fig. 24). The tube 310 telescopes freely over the projecting end of shaft 301 and the pin 308 extends through the disk 306 and is normally engaged within one of a series of apertures 311 formed in the index plate 305, the tube being normally urged in this direction by means of spring 312. A hand wheel 313 is mounted in the front wall of the main frame and in position to both pull the tube 310 outwardly to free the pin 308 from the aperture in the index plate, and to provide for rotation thereof with the corresponding rotation of shaft 301 by means of disk 306 which remains engaged over pin 308.

In operation, it will be evident that the hand wheel 313 can be drawn outwardly against spring 312 and rotated to cause corresponding rotation of tube 310 and of the disk 306, and shaft 301, to reposition the stop member 300 with any of its desired stop faces 302 in position to engage the bottom side of the piston. Upon release of the handle it returns to its normal position where the pin 308 enters the corresponding one of the apertures in the locking plate 305 and the stop is thus retained in the adjusted position. As a specific example, and assuming a total vertical adjustment in the drill heads themselves of ¾ inch, the bottom stop 300 will provide for an adjustment in the bottom stop position of the entire rail assembly of about ⅝ inch, in a sufficiently large number of steps or increments as shown to provide for accurate selection of a desired bottom stop position.

*Mechanical controls*

In accordance with the present invention, controls are provided for the operation of the machine which make it possible to trip the machine mechanically to begin the operation, the machine then continuing through to the completion of that operation with a downward stroke to the bottom position followed by a return stroke to its original top position without further manipulation on the part of the operator. This is what may be considered as a single cycle or individual operation requiring a separate tripping movement from the operator for each individual cycle.

It is also desirable to be able to operate the machine so that having been once tripped by the operator it will perform in a continuous manner, with one cycle following immediately after another.

It is further desired to provide for an emergency stopping of the machine and for this purpose an auxiliary manual control is provided by means of which the machine may be stopped at any position in its downward travel, as long as the control remains in one position, and if the control is then restored to its initial position, the stroke will proceed onward toward completion in the normal manner. If however the emergency control is actuated further, the stroke will not be completed but the rail assembly will return from whatever position it occupied when stopped toward its up or neutral position without having completed that stroke.

It is likewise desired to provide a control for limiting the top position of the rail assembly in order to shorten the stroke where for example the work is of small thickness, so that the length of travel required to complete a stroke is not more than is actually necessary for any individual operation. This provides for increasing the speed of operation and at the same time assuring a full extent of travel for the maximum height of pile of work material. In accordance with this invention a top stop is incorporated which is adjustable over a substantial range, for example about one inch, a typical machine having a maximum reciprocating movement of about two and one-half inches, so that the machine can be readily adjusted for most economical operation on work piles of varying height.

Figure 26:
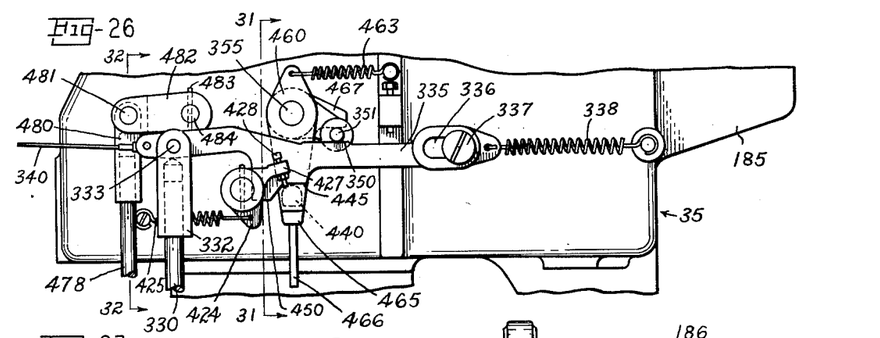
Fig. 26 is a view in broken side elevation from the outside of the power pack showing a portion of the mechanical controls for the machine.

Referring to Figs. 2, 3 and 26, the main actuating treadle for the machine is shown at 325 in the form of a substantially U-shaped bar pivotally supported on yokes 326 secured to the bottom of the main frame, the treadle extending outwardly beyond the front wall 11 although within the overhang of the work table 17. Compression spring 328 normally pulls the treadle toward its raised or neutral position, against the action of which it is depressed by the foot of the operator.

This motion is transmitted through push rod 330 which has a free sliding fit within socket 332 as shown in Fig. 26. Socket 332 is pivotally attached as shown at 333 to a beam 335 which has an elongated slot 336 and is mounted for vertical swinging movement about stem 337 passing through the slot. A tension spring 338 tends to draw the beam toward the right as shown in Fig. 26, and this motion is opposed by means of a pull wire 340 which is connected to a stem 342 (Fig. 15) passing through the front wall of the machine and on the outer end of which control knob 345 is located. This knob carries a rearwardly extending pin 346 which may be seated in either a shallow recess 347 or a deep recess 348 formed in the frame 11 which thus selectively positions the beam in either its forward or left hand position as shown in Fig. 26, or its rearward or right hand position. The left hand position corresponds to individual or single cycle operation, while the right hand position provides for continuous operation.

The beam is formed in an intermediate portion with flat face 350 (Fig. 26) which engages beneath a pin 351 integral with a lever 352 (Fig. 31) which in turn is pinned by means of pin 354 to a stub shaft 355 rotatably mounted in the right hand wall of the power pack 35.

Upon the inner side of the power pack, an arm 356 is pinned to shaft 355 by means of pin 351 and is formed with a downwardly extending arm 358 which has a forked open end 359 engaging over a pin 360 which is fixed to and movable with a link 362. The pin 360 is normally urged toward the front wall of the power pack by means of a spring 365 which engages over the recessed end 366 thereof, thus tending to move the pin assembly forwardly, or toward the left as shown in Fig. 27. The opposite end of the spring is fixed to a suitable abutment pin 367 mounted in bracket 368 secured on the bottom of the power pack (Fig. 32).

At its forward end, the link 362 is slotted as shown at 370 and engages over a pin 371 which is fixed to a shift yoke 373 rotatably supported on the bracket 368 for rotation about a shaft 375. The shift yoke has a forked and bifurcated upper end as shown at 376 (Figs. 27 and 32), the forked ends engaging over oppositely extending pins 377 carried on the valve shaft control member 201 of directional valve 200. Thus a rocking motion of the shift yoke 373 as produced by means of the travel of link 362 and pin 371, will provide for shifting the valve member 201 of the directional control valve between its down and up positions respectively.

From the above it will be apparent that an upward or clockwise swinging motion of the beam 335 as shown in Fig. 26 will impart a counter-clockwise motion to pin 351, and through it a similar motion of shaft 355 and of the inner arm 358. The forked ends 359 of such inner arm rotating in a counterclockwise direction (Fig. 27) cause a travel of pin 360 and thus of link 362 toward the right as seen in the figure, against the action of the tension spring 365. A spring 380 extends between a recess 381 on pin 360, and a recess 382 in pin 371 (Fig. 32) which is fixed in the shift yoke 373. Thus through the action of spring 380, the pin 371 is yieldingly maintained in fixed relation in the slotted end 370 of link 362, so that movement of the link as described causes a corresponding counterclockwise movement of the shift yoke 373, thereby moving the valve member 201 into its left hand or down position. The fluid is then supplied to the piston 218 in the direction to develop a downward travel of the rail assembly in the manner already described.

In order to latch the controls in this position, allowing the operator to remove his foot from the treadle while providing for continuance of the stroke of the machine, suitable latch mechanism is provided. This embodies a shift lever latch member 390 on the inside of the power pack which is rotatably mounted on stud 391 extending into bracket 368. The upper end of the shift lever latch is bifurcated as shown as 392 in Fig. 31 and the two arms thus provided are apertured to be received over pin 360, in straddling relation with respect to link 362. The shift lever latch 390 thus rocks in corresponding relation to the arm 358 but in the opposite direction. At its lower end, the member 390 is formed with a notch 395 which is adapted to be engaged by a locking member 397 mounted by means of bolt 398 upon bracket 368 and is normally urged toward locking position by compression spring 399.

By reference to Fig. 27 is will be apparent that with the treadle being actuated to cause a counterclockwise rotation of arm 358 as already described to initiate a downward operating stroke, the shift lever latch 399 will rock in a clockwise direction sufficiently to allow the lock 397 to engage in the notch 395, thereby retaining the lever 390 in its displaced position.

When so locked, the valve shaft stem 201 will be retained in its shifted or left hand position (Fig. 27) as already described, and the machine will thus continue in its downward stroke of movement without further manipulation on the part of the operator. When the operator takes his foot off the treadle, shaft 330 merely withdraws partially from its socket 332, but this does not affect the continued functioning of the machine.

When the machine reaches the bottom limit of its travel, the piston 218 engages the stop 300 as already described, and the further downward travel of the assembly is thereby interrupted. When this occurs, the fluid pressure in the system rapidly rises, and means are provided for utilizing this pressure increase to effect release of the latch lock 397. For this purpose a pressure tube 405 communicates with the T-fitting 207, and leads into a pressure chamber 406 (Fig. 23) which is formed in the bracket 368. This chamber receives an operating pin 408 which operates as a pressure plunger, the pin having a rounded lower end adapted to engage the latch lock 397 in the direction to effect release thereof. Also as shown in Fig. 27 a relief port 410 is provided and is uncovered by the pin 408 after it has traveled beyond its normal motion in releasing the latch for emergency relief purposes.

In operation, the normal pressure with the piston is insufficient to effect a releasing movement of pin 408 and thus the latch lock 397 is normally effective during the down stroke. When the rail assembly reaches its bottom position, however, the rise in pressure occasioned thereby is sufficient to force pin 408 downwardly to move the latch lock out of its locking position, with the result that spring 365 is then free to draw its pin 360 forwardly, moving link 362 to the left as shown in Fig. 27, and thereby causing a rocking of the shift yoke 373 from its down position, in a clockwise direction, and into its up position. This immediately effects a reversal of flow and fluid is then supplied by the directional valve to the lower side of the piston and the return stroke begins.

It will also be evident that if some excessive load should be encountered in the downward travel of the rail assembly, such as to impede its downward travel, a similar high pressure condition would develop which would cause the same pressure release of the latch lock 397, with a corresponding reversal of the directional valve to cause the downward travel of the machine to be stopped and to cause it to return to its up or neutral position. Thus an effective safety feature is incorporated in the functioning of the machine as well as a variable bottom stop.

In the event that for any reason the rail assembly should fail to return in its upward stroke in the manner described when it encounters an obstruction, a still higher pressure would develop and be transmitted through line 405 to the pressure chamber 406, causing a further downward actuation of pin 408 against spring 399, sufficiently to uncover in part at least the escape port 410. This would allow escape of pressure fluid into the reservoir without the building up of dangerously high or excessive pressure within the system.

Upon the rocking of the shift yoke 373 to its up position, its lower end rotates clockwise as shown in Fig. 27 and is provided with a notch 420 which is engaged by a locking member 422 fixed to shaft 423 which passes through the wall of the power pack. On the outside thereof, a lever 424 is secured to the shaft, and is normally biased to rotate in a clockwise direction as shown in Fig. 26 by means of tension spring 425. It also carries a forwardly projecting finger 427 in which there is mounted an adjustable set screw 428 for accurately determining the point of release thereof.

It will be evident that having been latched in its up position, the shift yoke 373 will be held therein by means of its lock 422, and the machine will thus continue on its upward stroke until such lock is released, to allow the shift yoke to return the directional valve from up toward its neutral position.

This release of the lock is effected by a member which travels with the rail assembly, but the position of which relative thereto is adjustable in order to vary the upper limit or upper stop position of the assembly. For this purpose the upper boss 57 on the right hand side of the cross head 56 is formed with an upwardly extending portion 430. An adjustable spider 432 is rotatably received over the post 25 and rests upon the upper end of the extension 430, being held against vertical travel by means of collar 433 while being free to rotate on the post. The spider is provided at its lower periphery with a series of notches 435 (Fig. 15) in one of which there is engaged a spring latch arm 436 having an operating knob 437 accessible from the right hand side of the machine through an aperture 438 therein. The spider has a series of arms 440 extending radially outwardly thereof and at progressively different elevations thereon. Thus by releasing the latch 436, the spider may be manually rotated on post 25 to bring a selected one of its arms 440 into operative position for actuating the control mechanism.

The selected or operative one of spider arms 440 occupies a position in vertical alignment with a flat surface 445 on the lower side of beam 335 as shown in Fig. 26. It is also in position to engage the lower end of the adjusting screw 428 as similarly shown.

In operation, and assuming the beam to be in the position shown providing for single or non-repeat operation, the spider arm 440 travels upwardly with the upward travel of the rail assembly and as it reaches the upper end of its stroke, it first engages the flat 445 on the beam, to effect a pivoting of the beam about its pin support 337. This action lifts pin 351, rotating lever 353, shaft 355 and arm 358, which motion is correspondingly transmitted to pin 360 and link 362. Link 362 is thereupon moved toward the right as shown in Fig. 27 and tension is applied to spring 380, tending to pull pin 371 and shift yoke 373 toward neutral position. However such motion of the shift yoke is prevented by its latch 422 which up to this point has not yet been released.

Upward travel of the arm 440 and of the beam 335 thus continues stretching spring 380 and moving link 362 but with pin 371 merely riding outwardly of the forked end of the link and without movement of shift yoke 373. When however a position of link 362 corresponding to the neutral setting of the valve stem 201 is reached, the arm 440 engages the set screw 428, causing the rocking of lever 427 in the direction to release latch 422 from notch 420, thereby freeing the shift yoke 373. The yoke immediately shifts from its up to its neutral position, being pulled into this position by spring 380 at which point it is stopped by engagement of its pin 371 in the inner end of the link 362. The machine is thus stopped at the limit of its upward travel and remains in neutral position pending a further treadle actuation by the operator. The set screw 428 is suitably adjusted to release the lock only after the arm 440 has engaged and raised the beam 335 to such position that the link 362 will be in proper location corresponding to neutral position of the directional valve.

By rotation of the spider 432, any desired one of its arms 440 may be selected for actuation of the beam in the manner already described, and thus the top stop position may be readily determined. As a specific example, the positions of spider arms 440 may be spaced from each other over the range as above described to thus establish a selected top position for the upward travel of the rail assembly.

When it is desired to actuate the machine for continuous operation, hand knob 345 is adjusted to seat the pin 346 in the deep recess 348, and this allows beam 335 to be drawn to the right as shown in Fig. 26 by means of spring 338 thereby bringing a second flat bearing surface 450 into the vertical line of travel of the spider arm 440. It will be evident that in this position, the upwardly traveling spider arm will engage the surface 450 earlier in its path of movement, and that it will travel upwardly substantially further before it engages the set screw 428 than was the case when the control was set for a single cycle operation. This results in a further upward swinging movement of the beam 335, such motion being transmitted through the path already described to cause the link 362 to travel further toward the right as shown in Fig. 27, and into the position corresponding to the down position of the directional valve in which position lock 397 will latch in as above described. Thus when the arm finally engages set screw 428, releasing the latch 422 on the shift yoke 373, the spring 380 pulls the shift yoke all the way from its up to its down position, thereby initiating a subsequent and successive cycle of operation. In this way the machine is adjusted for continuous operation, performing one cycle immediately following another without separate actuation of the treadle on the part of the operator.

When the machine is in a standby condition, with the pump motor operating but with the control set for single cycle operation and with the treadle raised, it remains with the rail assembly in its top position, the parts at this time being in the position shown in Fig. 26. Should the fluid leak out from beneath the piston 218, allowing the spider arm 440 to settle downward, that will allow a similar downwardly swinging movement of beam 335 which in turn will be transmitted through the mechanism already described, resulting in a shift of the yoke 373 in the direction from neutral toward the up position. This movement, although relatively slight, will allow a sufficient flow of pressure fluid to the piston in the up direction to maintain the rail assembly in its fully raised position, this condition thus being maintained indefinitely as long as the pump is in operation.

Figure 31:
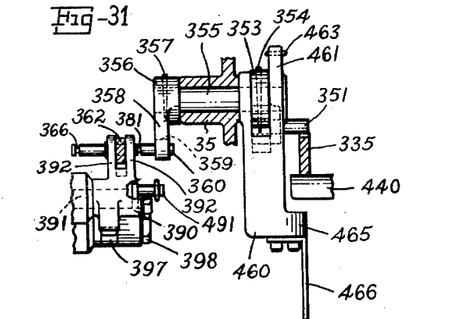
Fig. 31 is a somewhat modified vertical sectional view through the wall of the power pack substantially on the line 31—31 of Fig. 26.

When however the machine is shut down, i. e., when its fluid pump is not supplying fluid under pressure it is desired to avoid having the rail assembly drop toward the table and for this purpose a latch mechanism is provided. As shown in Fig. 26 this mechanism comprises a lever 460 which has an upper bifurcated portion 461 loosely mounted on the outer end of shaft 355 and embracing the lever 353, one arm of which is connected to a tension spring 463 to normally bias the latch in a clockwise direction as shown in Fig. 26. As shown in Fig. 31 the latch has a forwardly projecting nose 465 in the vertical path of the spider arm 440, and is also provided with a depending guide 466 which extends downwardly sufficiently far to overlie the entire vertical travel of the spider arm.

In the neutral position the parts are as shown in Figs. 26 and 31, and thus upon loss of pressure beneath the piston, the rail assembly will be allowed to fall only sufficiently to engage the arm 440 upon the nose 465 of the latch, and the rail assembly will thus be held mechanically adjacent its top position.

In order to provide for withdrawal of the nose 465 to a clearance position upon actuation of the machine, the latch is formed with a forwardly projecting part 467 which overlies pin 351 on the inside of the yoke 353 as shown in Fig. 30. From this it will be apparent that upward travel of pin 351 with corresponding counterclockwise rotation of lever 353 will result in the overhanging end of pin 351 engaging the arm 467 of the latch, causing it to rock likewise in a counterclockwise direction against the bias of spring 463, and thereby to swing its nose 465 to a clearance position allowing the downward passage of arm 440. The extension 466 is provided to assure that even though the beam moved downwardly in the course of the cycle, the latch will always remain on the same side of the arm 440, the arm merely sliding upwardly against the extension on its upward travel and passing freely over nose portion 465 into the neutral position as shown in Fig. 26, the lower side of the nose 465 being suitably shaped to allow such free upward travel of the spider arm. When the pump is restarted after a period of shutdown, the slightly lowered position of the beam 335 resulting from the resting of the spider arm 440 on lug 465 will open the directional valve enough to supply fluid in the direction to raise the piston.

Referring now to the emergency stop operations it is desired to provide for the stopping of the motion of the machine at any desired point on its downward or working stroke, under the control of the operator. This control is such that the operator by actuating the control can stop and retain the rail assembly in any desired position, following which he can release it for either completion of the stroke from the point at which it was interrupted, or cause it to return toward its top or neutral position without completion of the stroke.

This is accomplished by an emergency treadle 475 (Figs. 2 and 3) which is suitably pivoted in yoke 476 carried by the frame and normally biased to neutral position. Actuation of the treadle causes an upward movement of push rod 478 which has sliding engagement in a socket 480 (Fig. 26). The socket is pivotally attached by means of pin 481 to a lever 482 pinned by means of pin 483 to shaft 484, the shaft extending through the side wall of the power pack and having a lever 485 (Fig. 27) fixed thereto by means of pin 486 on the inside of the power pack.

Lever 485 is adapted to engage against pin 371 carried by shift yoke 373. Thus upon actuation of the emergency treadle 475, lever 485 is caused to rotate in a clockwise direction, and to thus withdraw pin 371 from the forked arms 370 of the link 362, against the action of spring 380. This causes an immediate and direct shifting of the yoke 373 from its down to its neutral position. Thus as long as the emergency treadle is held in its depressed position, the control valve remains in neutral and the piston and rail assembly are stopped in any intermediate position of their downward travel. Upon release of the foot treadle from this position, the parts return to their original positions and the downward travel of the piston is continued from the point at which it was stopped to complete the cycle.

When however the emergency treadle is depressed further, to its lowermost position, a further clockwise rotation of lever 485 takes place. This actuation provides for the direct rotation of the shift yoke 373 to its full up position, thus causing the reversal of the stroke from whatever position the piston occupied at the time when the emergency treadle was depressed. In addition, the arm 485 has pivoted thereto a rod 490 (Fig. 27) which is looped over a pin 491 fixed in an arm formed integrally with the latch lock member 397. It will be apparent that the partial rotation of lever 485 as described in connection with the stoppage only of the travel of the piston, does not pick up pin 491, but when the lever is fully depressed, the end of the loop picks up the pin 491 and rotates the latch 397 in the direction to release the lock. Thus the directional valve stem 201 is allowed to remain in its up position, the rail assembly returns to its fully raised or neutral position, and further operation of the machine terminates.

It will thus be apparent that the invention provides a hydraulic paper drill which is simple, safe and reliable in operation, which can be readily constructed and repaired when necessary, and which is highly advantageous in the range of its adjustment and flexibility to meet different conditions in use.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a multiple spindle drill of the character described, a rail assembly, a plurality of drill heads mounted for individual adjustment on said rail assembly, each said head having a discharge for the chips produced thereby, and chip conveying means carried by said rail assembly for withdrawing the chips produced by the several said drills including an open slot extending along and closely adjacent the zone of discharge of said drills, a suction chamber above and communicating with said slot and of substantially greater area than said slot providing for high flow velocities through said slot and substantially reduced flow velocities in said chamber, said chamber having a smooth upwardly curved rear wall in the path of travel of the chips from said slot to cause the chips to travel upwardly therein and to be dropped repeatedly into the rapidly traveling air in the area of said slot to thus traverse said chamber with a spiral motion, and means connected to said chamber for creating suction therein to cause said chips to be drawn through said slot and to travel along said chamber toward a point of discharge therefrom.

2. In a multiple spindle drill of the character described, a rail assembly, a plurality of drill heads mounted for individual adjustment on said rail assembly, each said head having a discharge for the chips produced thereby, and chip conveying means for withdrawing the chips produced by said drills at any location thereof on said rail assembly including an open slot of relatively limited cross-sectional area extending along and closely adjacent the zone of discharge of said drills, a suction chamber communicating with said slot and of substantially greater area than said slot providing for high flow velocities through said slot and substantially reduced flow velocities in said chamber, and means connected to said chamber for creating suction therein to cause said chips to be drawn through said slot and to travel along said chamber toward the suction end thereof.

3. In a multiple spindle drill of the character described, a rail assembly, a plurality of drill heads mounted for individual adjustment on said rail assembly, each said head having a discharge for the chips produced thereby, and chip conveying means for withdrawing the chips produced by said drills in all locations of said drill heads on said assembly including an open slot extending along and closely adjacent the zone of discharge of said drills having a throat portion of reduced cross-section, a suction chamber communicating with said slot and of substantially greater area than said slot providing for high flow velocities through said slot and throat with substantially reduced flow velocities in said chamber, and means connected to said chamber for creating suction therein to cause said chips to be drawn through said slot and to travel along said chamber toward the suction end thereof, the point of connection of said suction creating means with the chamber being above the level of the bottom wall of the chamber.

4. In a multiple spindle drill of the character described, a rail assembly, a plurality of drill heads mounted for individual adjustment along the length of said rail assembly, each said head having a discharge for the chips produced thereby, and chip conveying means for withdrawing the chips produced by said drills at any location thereof on said rail assembly including a relatively large suction chamber, means on said rail assembly adjacent the zone of discharge from said drill heads forming a series of separate inflow passages of relatively small dimensions extending across the length of said rail assembly, each said passage opening into said suction chamber, and means connected to said chamber for creating suction therein causing a flow therethrough with a substantially higher inflow velocity through said inflow passages to collect and entrain chips formed by said drill heads.

5. In a multiple spindle drill of the character described, a rail assembly, a plurality of drill heads mounted for individual adjustment along the length of said rail assembly, each said head having a discharge for the chips produced thereby, and chip conveying means for withdrawing the chips produced by said drills at any location thereof on said rail assembly including a plate extending across the length of said rail assembly in the zone of discharge from said drill heads to receive the chips discharged therefrom, flow passage means extending in tapered relation away from said discharge zone toward a throat portion of minimum cross-section, a relatively large suction chamber communicating directly with said throat portion, and means for creating suction in said suction chamber to cause a flow therethrough with a relatively higher velocity flow through said throat portion to entrain and withdraw chips discharged from said drill heads upon said plate.

6. A multiple spindle drill as defined in claim 5 in which the suction chamber is carried by said rail assembly and located generally above and communicating with the rear portion of the throat.

7. A paper drill as defined in claim 2 in which the chip conveying means includes a discharge receptacle below the work table, and connections extending from the suction chamber above the work table to said discharge receptacle and located laterally of the working space on the work table leaving such space substantially unobstructed.

8. A paper drill as defined in claim 7 including slots in the work table adjacent the working positions of the drills for receiving chips falling on to the table, and passage means for delivering such chips into the same discharge receptacle.

WILLIAM R. SPILLER.
LLOYD L. WEST.

References Cited in the file of this patent

UNITED STATES PATENTS

| Number | Name | Date |
|---|---|---|
| Re. 20,483 | Lewis | Aug. 24, 1937 |
| 1,385,820 | Forman | July 26, 1921 |
| 1,512,547 | Klein | Oct. 21, 1924 |
| 1,553,378 | Harper | Sept. 15, 1925 |
| 1,553,383 | Killingsworth | Sept. 15, 1925 |
| 1,625,748 | Schiess | Apr. 19, 1927 |
| 1,835,551 | Wright | Dec. 8, 1931 |
| 1,911,132 | Macomber | May 23, 1933 |
| 1,911,138 | Clute et al. | May 23, 1933 |
| 1,912,184 | Ferris et al. | May 30, 1933 |
| 1,924,138 | Strawn | Aug. 29, 1933 |
| 1,931,452 | Wheeler | Oct. 17, 1933 |
| 1,952,690 | Strom | Mar. 27, 1934 |
| 2,060,313 | Hill | Nov. 10, 1936 |
| 2,079,640 | Vickers | May 11, 1937 |
| 2,142,560 | Eickman | Jan. 3, 1939 |
| 2,167,279 | Manny | July 25, 1939 |
| 2,264,786 | Barley | Dec. 2, 1941 |
| 2,282,977 | Mast | May 12, 1942 |
| 2,356,046 | Garlick | Aug. 15, 1944 |
| 2,494,836 | Segal | Jan. 17, 1950 |
| 2,527,458 | Schurr | Oct. 24, 1950 |